US012776970B2

(12) United States Patent
Arokkiam et al.

(10) Patent No.: US 12,776,970 B2
(45) Date of Patent: Oct. 27, 2026

(54) TELECOMMUNICATIONS NETWORK

(71) Applicant: BRITISH TELECOMMUNICATIONS PUBLIC LIMITED COMPANY, London (GB)

(72) Inventors: Jerome Arokkiam, London (GB); Simon Ringland, London (GB); Francis Scahill, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/727,448

(22) PCT Filed: Dec. 15, 2022

(86) PCT No.: PCT/EP2022/086246

§ 371 (c)(1),
(2) Date: Jul. 9, 2024

(87) PCT Pub. No.: WO2023/131496

PCT Pub. Date: Jul. 13, 2023

(65) Prior Publication Data

US 2025/0112842 A1 Apr. 3, 2025

(30) Foreign Application Priority Data

Jan. 10, 2022 (GB) ...................................... 2200251

(51) Int. Cl.
*H04L 43/04* (2022.01)
*H04L 41/16* (2022.01)
(Continued)

(52) U.S. Cl.
CPC .............. *H04L 43/04* (2013.01); *H04L 41/16* (2013.01); *H04L 43/08* (2013.01); *H04W 24/10* (2013.01)

(58) Field of Classification Search
None
See application file for complete search history.

(56) References Cited

U.S. PATENT DOCUMENTS 7,415,535 B1 8/2008 Kuik et al.
8,989,101 B1 3/2015 Mishra
(Continued)

FOREIGN PATENT DOCUMENTS

CN 106060878 A 10/2016
CN 110493363 A 11/2019
(Continued)

OTHER PUBLICATIONS

Extended European Search Report received for European Patent Application No. 22178706.2, mailed on Oct. 13, 2022, 6 pages.
(Continued)

*Primary Examiner* — Anh Nguyen
(74) *Attorney, Agent, or Firm* — EIP US LLP

(57) ABSTRACT

This disclosure provides a method of analyzing a wireless local area network, the wireless local area network including a plurality of devices wherein at least one device of the plurality of devices is configured to change its Media Access Control (MAC) address, the method including obtaining data including a plurality of records, wherein each record of the plurality of records relates to a device of the plurality of devices and includes: a device label, a MAC address, and a set of performance metrics; for each device label in the plurality of records, determining a uniqueness value for that device label based on a count of records in the plurality of records having that device label; processing each record of the plurality of records so as to assign a unique identifier to the record by determining that the MAC address of the record is a local MAC address and that the uniqueness value of the device label satisfies a uniqueness threshold; and
(Continued)

analyzing the set of performance metrics for a plurality of records having the same unique identifier.

5 Claims, 11 Drawing Sheets

(51) Int. Cl.
*H04L 43/08* (2022.01)
*H04W 24/10* (2009.01)

(56) References Cited

U.S. PATENT DOCUMENTS

| | | | |
|---|---|---|---|
| 10,251,049 | B2 | 4/2019 | Seidman et al. |
| 10,862,885 | B2 | 12/2020 | Zhang et al. |
| 10,944,663 | B2 | 3/2021 | Sugatoor et al. |
| 10,979,848 | B1 | 4/2021 | Palappetty et al. |
| 11,102,843 | B2 | 8/2021 | Chan et al. |
| 11,902,246 | B2 | 2/2024 | Barton et al. |
| 12,192,770 | B2 | 1/2025 | Ficara et al. |
| 12,388,782 | B2 | 8/2025 | Arokkiam et al. |
| 2002/0031101 | A1 | 3/2002 | Petite et al. |
| 2005/0044273 | A1 | 2/2005 | Bouchat et al. |
| 2007/0201490 | A1 | 8/2007 | Mahamuni |
| 2008/0031185 | A1 | 2/2008 | Bims |
| 2009/0265455 | A1 | 10/2009 | Hiraki |
| 2010/0165910 | A1 | 7/2010 | Mathews et al. |
| 2011/0191827 | A1 | 8/2011 | Balay |
| 2012/0155473 | A1 | 6/2012 | Figueira et al. |
| 2013/0237242 | A1 | 9/2013 | Oka et al. |
| 2014/0098705 | A1 | 4/2014 | Chow et al. |
| 2015/0009901 | A1 | 1/2015 | Gorajala Chandra et al. |
| 2016/0081009 | A1 | 3/2016 | Tailor et al. |
| 2016/0131733 | A1 | 5/2016 | Do et al. |
| 2016/0330165 | A1 | 11/2016 | Jeanne et al. |
| 2017/0237773 | A1 | 8/2017 | Wallace et al. |
| 2017/0347301 | A1 | 11/2017 | Stationwala et al. |
| 2019/0318028 | A1* | 10/2019 | Cao ........................ G06Q 10/00 |
| 2020/0344203 | A1* | 10/2020 | Mermoud ........... H04L 61/5014 |
| 2021/0112097 | A1 | 4/2021 | Jiang et al. |
| 2021/0266319 | A1 | 8/2021 | Olshansky |
| 2021/0337460 | A1 | 10/2021 | Breaux, III et al. |
| 2021/0409316 | A1* | 12/2021 | Seshan .................... H04L 41/40 |
| 2022/0200950 | A1 | 6/2022 | Sekar et al. |
| 2022/0382611 | A1 | 12/2022 | Kapish et al. |
| 2023/0091127 | A1 | 3/2023 | Lin et al. |
| 2023/0199669 | A1 | 6/2023 | Vannithamby et al. |
| 2023/0209390 | A1 | 6/2023 | Zeng et al. |
| 2024/0381096 | A1* | 11/2024 | Beg ....................... H04W 12/79 |

FOREIGN PATENT DOCUMENTS

| | | | |
|---|---|---|---|
| CN | 108667951 | B | 4/2021 |
| EP | 3174363 | A1 | 5/2017 |
| EP | 4178160 | A1 | 2/2024 |
| KR | 20200038731 | A | 4/2020 |
| WO | 2014189462 | A1 | 11/2014 |
| WO | 2021104657 | A1 | 6/2021 |
| WO | 2022029415 | A1 | 2/2022 |
| WO | 2022039669 | A1 | 2/2022 |
| WO | 2022162438 | A1 | 8/2022 |
| WO | 2022225714 | A1 | 10/2022 |
| WO | 2023131496 | A1 | 7/2023 |
| WO | 2023131497 | A1 | 7/2023 |
| WO | 2023241856 | A1 | 12/2023 |

OTHER PUBLICATIONS

Extended European Search Report received for European Patent Application No. 22178707.0, mailed on Nov. 16, 2022, 8 pages.
Intention to Grant received for Great Britain Patent Application No. 2208625.0, mailed Apr. 4, 2024, 2 pages.
Intention to Grant received for Great Britain Patent Application No. 2208631.8, mailed on May 20, 2024, 2 pages.
International Preliminary Report on Patentability received for PCT Patent Application No. PCT/EP2022/086246, mailed on Dec. 18, 2023, 15 pages.
International Preliminary Report on Patentability received for PCT Patent Application No. PCT/EP2022/086247, mailed on Mar. 22, 2024, 16 pages.
International Preliminary Report on Patentability received for PCT Patent Application No. PCT/EP2023/061926, mailed on Apr. 2, 2024, 11 pages.
International Search Report and Written Opinion received for PCT Patent Application No. PCT/EP2023/061926, mailed on Jul. 21, 2023, 10 pages.
International Search Report and Written Opinion received for PCT Patent Application No. PCT/EP2022/086246, mailed on Apr. 5, 2023, 15 pages.
International Search Report and Written Opinion received for PCT Patent Application No. PCT/EP2022/086247, mailed on Mar. 16, 2023, 12 pages.
International Search Report and Written Opinion received for PCT Patent Application No. PCT/EP2023/061913, mailed on Aug. 10, 2023, 14 pages.
Office Action received for Great Britain Patent Application No. 2200251.3, mailed on Jan. 18, 2023, 3 pages.
Office Action received for Great Britain Patent Application No. 2200251.3, mailed on Jul. 1, 2022, 6 pages.
Office Action received for Great Britain Patent Application No. 2200253.9, mailed on Jan. 18, 2023, 3 pages.
Office Action received for Great Britain Patent Application No. 2200253.9, mailed on Jul. 1, 2022, 5 pages.
Office Action received for Great Britain Patent Application No. 2208625.0, mailed on Jul. 12, 2023, 3 pages.
Office Action received for Great Britain Patent Application No. 2208625.0, mailed on Nov. 3, 2022, 5 pages.
Search Report received for Great Britain Application No. 2208631. 8, mailed on Nov. 2, 2022, 4 pages.
Written Opinion of the International Preliminary Examining Authority received for PCT Patent Application No. PCT/EP2022/086247, mailed on Nov. 29, 2023, 9 pages.
Akiyama , et al., "A Study on Device Identification from BLE Advertising Packets with Randomized MAC Addresses", IEEE International Conference on Consumer Electronics-Asia, 2021, 4 pages.
Uras , et al., "Wifi Probes Sniffing: An Artificial Intelligence Based Approach for MAC Addresses De-randomization", IEEE 25th International Workshop on Computer Aided Modeling and Design of Communication Links and Networks, 2020, 6 pages.
Notice of Allowance received for Great Britain Patent Application No. 2200251.3, mailed on Jun. 26, 2024, 2 pages.
Notice of Allowance received for Great Britain Patent Application No. 2200253.9, mailed on Jun. 26, 2024, 2 pages.
CN First Office Action for CN202280084656.9 mailed on Nov. 22, 2024, 7 pgs.
Communication Under Rule 71(3) EPC for EP22835808.1 mailed on Dated Dec. 2, 2024, 8 pgs.
International Preliminary Report on Patentability for PCT/EP2023/061913 mailed on dated Dec. 26, 2024, 10 pgs.
Martin et al., "A Study of MAC Address Randomization in Mobile Devices and When it Fails", Proceedings on Privacy Enhancing Technologies, vol. 4, 2017, pp. 268-286.
Prasad et al., "A Case Study on the Monitor Mode Passive Capturing of WLAN Packets in an On-the-Move Setup", IEEE Access, vol. 9, 2021, p. 152408-152420.
Vanhoef et al., "Why MAC Address Randomization is not Enough: An Analysis of Wi-Fi Network Discovery Mechanisms", Asia Ccs '16: Proceedings of the 11th ACM on Asia Conference on Computer and Communications Security, 2016, pp. 413-424.
Yu et al., "You Are What You Broadcast: Identification of Mobile and loT Devices from (Public) WiFi", USENIX Association: 29th USENIX Security Symposium, Aug. 12-14, 2020, pp. 55-72.

* cited by examiner

| Daily KPI Table | | | | |
|---|---|---|---|---|
| MAC Address | Date of Record | Host Name | No. of Timestamps with the MAC, Date and Hostname | Total Active Time |
| MAC1 | Day1 | Phone_abc | 24 | 1440 |
| MAC1 | Day2 | Phone_abc | 24 | 1440 |
| MAC1 | Day3 | Phone_abc | 24 | 1440 |
| MAC1 | Day4 | Phone_abc | 24 | 1440 |
| MAC1 | Day5 | Phone_abc | 24 | 1440 |
| MAC1 | Day6 | Phone_abc | 24 | 1440 |
| MAC1 | Day7 | Phone_abc | 24 | 1440 |
| MAC1 | Day8 | Phone_abc | 24 | 1440 |
| MAC1 | Day9 | Phone_abc | 24 | 1440 |
| MAC1 | Day10 | Phone_abc | 24 | 1440 |
| MAC1 | Day11 | Phone_abc | 11 | 660 |
| MAC2 | Day11 | Phone_abc | 14 | 840 |
| MAC2 | Day12 | Phone_abc | 24 | 1440 |
| MAC2 | Day13 | Phone_abc | 24 | 1440 |
| MAC2 | Day14 | Phone_abc | 24 | 1440 |
| MAC2 | Day15 | Phone_abc | 24 | 1440 |
| MAC2 | Day16 | Phone_abc | 24 | 1440 |
| MAC2 | Day17 | Phone_abc | 24 | 1440 |
| MAC2 | Day18 | Phone_abc | 24 | 1440 |
| MAC2 | Day19 | Phone_abc | 13 | 780 |
| MAC3 | Day19 | Phone_abc | 12 | 720 |
| MAC3 | Day20 | Phone_abc | 24 | 1440 |
| MAC3 | Day21 | Phone_abc | 24 | 1440 |
| MAC3 | Day22 | Phone_abc | 24 | 1440 |
| MAC3 | Day23 | Phone_abc | 24 | 1440 |
| MAC3 | Day24 | Phone_abc | 24 | 1440 |
| MAC3 | Day25 | Phone_abc | 24 | 1440 |
| MAC3 | Day26 | Phone_abc | 24 | 1440 |
| MAC3 | Day27 | Phone_abc | 24 | 1440 |
| MAC3 | Day28 | Phone_abc | 24 | 1440 |

Figure 4

| Daily Hostname Count Table | | | |
|---|---|---|---|
| Hostname | CalculationDate | SampleCount | UniqueTimeStampCount |
| Phone_abc | Day1 | 24 | 24 |
| Phone_abc | Day2 | 24 | 24 |
| Phone_abc | Day3 | 24 | 24 |
| Phone_abc | Day4 | 24 | 24 |
| Phone_abc | Day5 | 24 | 24 |
| Phone_abc | Day6 | 24 | 24 |
| Phone_abc | Day7 | 24 | 24 |
| Phone_abc | Day8 | 24 | 24 |
| Phone_abc | Day9 | 24 | 24 |
| Phone_abc | Day10 | 24 | 24 |
| Phone_abc | Day11 | 25 | 24 |
| Phone_abc | Day12 | 24 | 24 |
| Phone_abc | Day13 | 24 | 24 |
| Phone_abc | Day14 | 24 | 24 |
| Phone_abc | Day15 | 24 | 24 |
| Phone_abc | Day16 | 24 | 24 |
| Phone_abc | Day17 | 24 | 24 |
| Phone_abc | Day18 | 24 | 24 |
| Phone_abc | Day19 | 25 | 24 |
| Phone_abc | Day20 | 24 | 24 |
| Phone_abc | Day21 | 24 | 24 |
| Phone_abc | Day22 | 24 | 24 |
| Phone_abc | Day23 | 24 | 24 |
| Phone_abc | Day24 | 24 | 24 |
| Phone_abc | Day25 | 24 | 24 |
| Phone_abc | Day26 | 24 | 24 |
| Phone_abc | Day27 | 24 | 24 |
| Phone_abc | Day28 | 24 | 24 |

Figure 5

| Hostname Uniqueness Table | | | | | |
|---|---|---|---|---|---|
| Hostname | Sum of SampleCount in 28 days | Sum of UniqueTimeStampCount in 28 days | Uniqueness Ratio | IsUnique | CalculationDate |
| Phone_abc | 674 | 672 | 1.00297619 | YES | Day28 |

Figure 6

KPI Merged Table

| MAC Address | Date of Record | Host Name | No. of Timestamps with the MAC, Date and Hostname | Total Active Time | IsUnique | CalculationDate | Unique Identifier | Unique Hostname |
|---|---|---|---|---|---|---|---|---|
| MAC1 | Day1 | Phone_abc | 24 | 1440 | YES | Day28 | MAC3 | Phone_abc |
| MAC1 | Day2 | Phone_abc | 24 | 1440 | YES | Day28 | MAC3 | Phone_abc |
| MAC1 | Day3 | Phone_abc | 24 | 1440 | YES | Day28 | MAC3 | Phone_abc |
| MAC1 | Day4 | Phone_abc | 24 | 1440 | YES | Day28 | MAC3 | Phone_abc |
| MAC1 | Day5 | Phone_abc | 24 | 1440 | YES | Day28 | MAC3 | Phone_abc |
| MAC1 | Day6 | Phone_abc | 24 | 1440 | YES | Day28 | MAC3 | Phone_abc |
| MAC1 | Day7 | Phone_abc | 24 | 1440 | YES | Day28 | MAC3 | Phone_abc |
| MAC1 | Day8 | Phone_abc | 24 | 1440 | YES | Day28 | MAC3 | Phone_abc |
| MAC1 | Day9 | Phone_abc | 24 | 1440 | YES | Day28 | MAC3 | Phone_abc |
| MAC1 | Day10 | Phone_abc | 24 | 1440 | YES | Day28 | MAC3 | Phone_abc |
| MAC1 | Day11 | Phone_abc | 11 | 660 | YES | Day28 | MAC3 | Phone_abc |
| MAC2 | Day11 | Phone_abc | 14 | 840 | YES | Day28 | MAC3 | Phone_abc |
| MAC2 | Day12 | Phone_abc | 24 | 1440 | YES | Day28 | MAC3 | Phone_abc |
| MAC2 | Day13 | Phone_abc | 24 | 1440 | YES | Day28 | MAC3 | Phone_abc |
| MAC2 | Day14 | Phone_abc | 24 | 1440 | YES | Day28 | MAC3 | Phone_abc |
| MAC2 | Day15 | Phone_abc | 24 | 1440 | YES | Day28 | MAC3 | Phone_abc |
| MAC2 | Day16 | Phone_abc | 24 | 1440 | YES | Day28 | MAC3 | Phone_abc |
| MAC2 | Day17 | Phone_abc | 24 | 1440 | YES | Day28 | MAC3 | Phone_abc |
| MAC2 | Day18 | Phone_abc | 24 | 1440 | YES | Day28 | MAC3 | Phone_abc |
| MAC2 | Day19 | Phone_abc | 13 | 780 | YES | Day28 | MAC3 | Phone_abc |
| MAC3 | Day19 | Phone_abc | 12 | 720 | YES | Day28 | MAC3 | Phone_abc |
| MAC3 | Day20 | Phone_abc | 24 | 1440 | YES | Day28 | MAC3 | Phone_abc |
| MAC3 | Day21 | Phone_abc | 24 | 1440 | YES | Day28 | MAC3 | Phone_abc |
| MAC3 | Day22 | Phone_abc | 24 | 1440 | YES | Day28 | MAC3 | Phone_abc |
| MAC3 | Day23 | Phone_abc | 24 | 1440 | YES | Day28 | MAC3 | Phone_abc |
| MAC3 | Day24 | Phone_abc | 24 | 1440 | YES | Day28 | MAC3 | Phone_abc |
| MAC3 | Day25 | Phone_abc | 24 | 1440 | YES | Day28 | MAC3 | Phone_abc |
| MAC3 | Day26 | Phone_abc | 24 | 1440 | YES | Day28 | MAC3 | Phone_abc |
| MAC3 | Day27 | Phone_abc | 24 | 1440 | YES | Day28 | MAC3 | Phone_abc |
| MAC3 | Day28 | Phone_abc | 24 | 1440 | YES | Day28 | MAC3 | Phone_abc |

Figure 7

| KPI Merged Table | | | |
|---|---|---|---|
| **CalculationDate** | **Unique Identifier** | **Unique Hostname** | **Total Active Time** |
| Day 28 | MAC3 | Phone_abc | 40440 |

Figure 8

TELECOMMUNICATIONS NETWORK

PRIORITY CLAIM

The present application is a National Phase entry of PCT Application No. PCT/EP2022/086246, filed Dec. 15, 2022, which claims priority from GB Application No. 2200251.3, filed Jan. 10, 2022, each of which hereby fully incorporated herein by reference.

TECHNICAL FIELD

The present disclosure relates to a telecommunications network.

BACKGROUND

A Customer Premises Equipment (CPE) in a telecommunications network is a device typically located in a customer's home or business that connects the customer to an operator's network (such as a Digital Subscriber Line (DSL) network, a Fiber To The Premises (FTTP) network, and/or a cellular network). The CPE may also provide the customer with a local area network (including a wireless local area network) to connect one or more devices to the network operator's network.

A CPE may be remotely managed by the operator. Remote management may be implemented by an Auto-Configuration Server (ACS) using the TR-69 protocol (as standardized by the Broadband Forum). The TR-69 protocol defines a dataset that is periodically collected from the CPE for analysis by the ACS. This dataset identifies all devices connected to the CPE. The ACS analyses this data as part of a management service (e.g. to identify faults).

The dataset collected under the TR-69 protocol identifies each device connected to the hub by its Media Access Control (MAC) address. However, some devices now change their MAC address based on a MAC randomization process. MAC randomization is a process in which the device uses a randomly generated MAC address, instead of its actual MAC address, when communicating with other devices in a network. One of the first uses of MAC randomization was for devices to transmit a randomly generated MAC address as part of a probe request message when scanning for network access points, but use their actual MAC address when connecting to one of those network access points. This process was subsequently developed so that a device would connect to a network access point using a MAC address randomly generated for that network (such that the device uses a different randomly generated MAC address for each network it connects to). Each network would thereafter identify that device by its network-specific randomly generated MAC address. This process has more recently been developed so that a device, once connected to a network, periodically (e.g. once per day) updates this identifier in the network with a new randomly generated MAC address. This may be implemented by reconnecting to the network with a new, randomly generated MAC address.

This periodic MAC randomization process creates a technical problem in that the MAC address can no longer be used as a persistent identifier for a device over a time-period that is greater than the periodicity of the MAC randomization. For example, if a first record in a network-specific dataset is collected prior to an instance of a periodic MAC randomization process and a second record in the same network-specific dataset is collected following that MAC randomization instance, then it cannot be determined whether those records relate to two separate devices or to the same device that has performed a MAC randomization. This problem applies to the dataset collected using the TR-69 protocol, but also applies to any other dataset which identifies each device connected to a particular network by its MAC address. When applied to the TR-69 dataset, the operator's management processes (such as fault identification and/or network optimization) may suffer as a result.

SUMMARY

According to a first aspect of the disclosure, there is provided a method of analyzing a wireless local area network, the wireless local area network including a plurality of devices wherein at least one device of the plurality of devices is configured to change its Media Access Control, MAC, address, the method comprising obtaining data including a plurality of records, wherein each record of the plurality of records relates to a device of the plurality of devices and includes: a device label, a MAC address, and a set of performance metrics; for each device label in the plurality of records, determining a uniqueness value for that device label based on a count of records in the plurality of records having that device label; processing each record of the plurality of records so as to assign a unique identifier to the record by determining that the MAC address of the record is a local MAC address and that the uniqueness value of the device label satisfies a uniqueness threshold; and analyzing the set of performance metrics for a plurality of records having the same unique identifier.

The uniqueness value may be based on a ratio of a count of records in the plurality of records that use that device label to a count of distinct timestamps in the plurality of records that use that device label.

Analyzing the set of performance metrics may include combining the set of performance metrics for all records using the same unique identifier.

The method may further comprise causing a configuration of a device of the plurality of devices based on the analysis.

According to a second aspect of the disclosure, there is provided a computer program comprising instructions which, when the program is executed by a computer, cause the computer to carry out the method of the first aspect of the disclosure. The computer program may be stored on a computer readable carrier medium.

According to a third aspect of the disclosure, there is provided a data processing apparatus comprising a processor adapted to perform the method of the first aspect of the disclosure.

BRIEF DESCRIPTION OF THE FIGURES

In order that the present disclosure may be better understood, embodiments thereof will now be described, by way of example only, with reference to the accompanying drawings in which:

FIG. 4 is an example data extract of a key performance indicator table during implementation of the first embodiment of the method of the present disclosure.

FIG. 5 is an example data extract of a daily hostname count table during implementation of the first embodiment of the method of the present disclosure.

FIG. 6 is an example data extract of a hostname uniqueness table during implementation of the first embodiment of the method of the present disclosure.

FIG. 7 is a first example data extract of a key performance indicator merged table during implementation of the first embodiment of the method of the present disclosure.

FIG. 8 is a second example data extract of a key performance indicator merged table during implementation of the first embodiment of the method of the present disclosure.

DETAILED DESCRIPTION OF EMBODIMENTS

Figure 1:
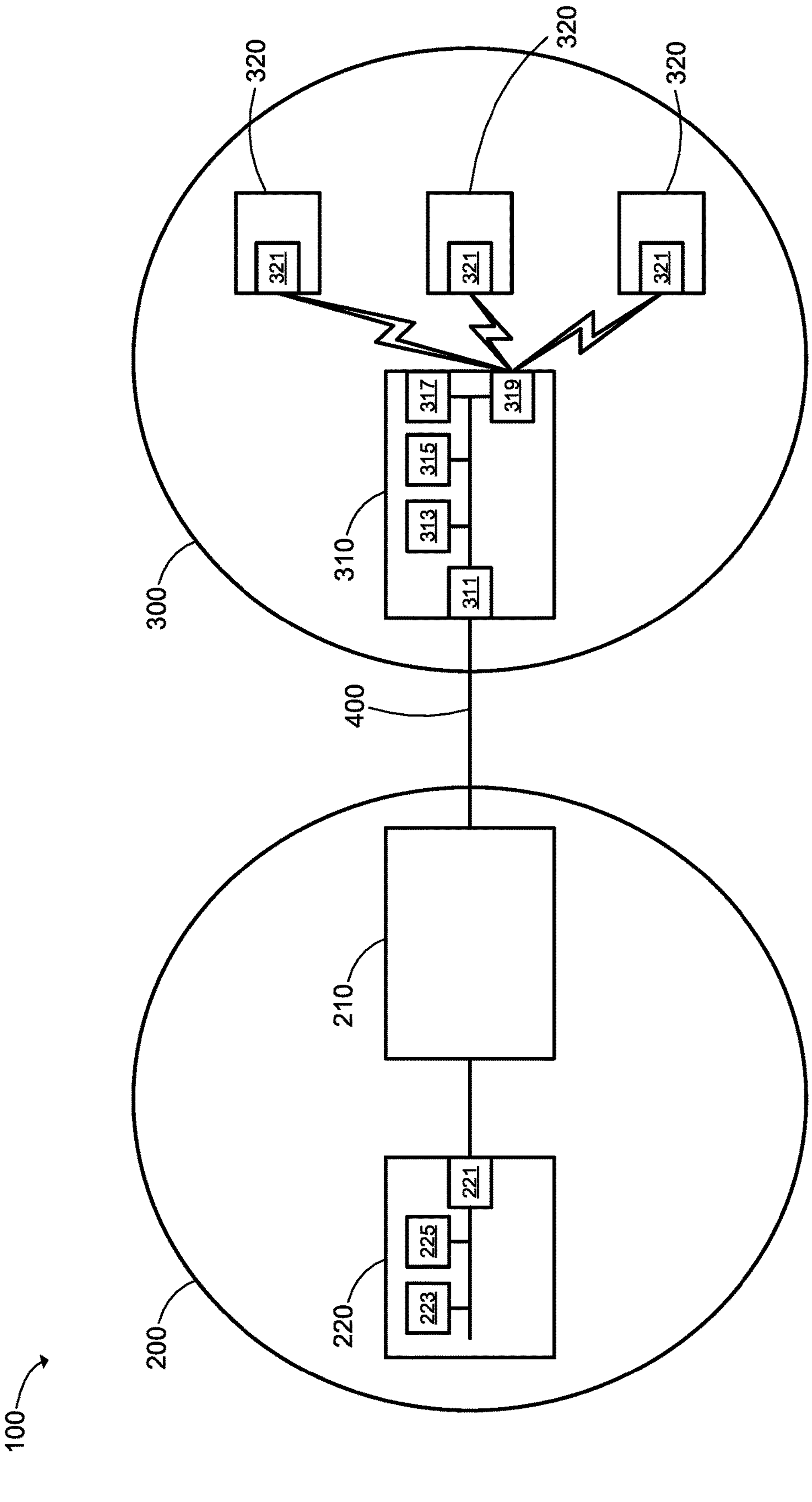
FIG. 1 is a schematic diagram of a telecommunications network of a first and second embodiment of the present disclosure.

A first embodiment of a telecommunications network 100 will now be described with reference to FIG. 1. The telecommunications network 100 includes an operator's network 200 and a customer's network 300. The operator's network 200 and customer's network 300 are connected by an access connection 400, which in this embodiment is a Digital Subscriber Line (DSL). The customer's network 300 includes a Customer Premises Equipment (CPE) 310 and a plurality of user devices 320.

The CPE 310 includes an access network communications interface 311, a processor 313, memory 315, a wired communications interface 317 and a wireless communications interface 319. The access network communications interface 311 enables the CPE 310 to communicate with the operator's network 200 via the access connection 400. The wired and wireless communications interfaces 317, 319 respectively enable the CPE 310 to provide a wired local area network and a wireless local area network.

In this embodiment the plurality of user devices 320 each include a wireless communications interface 321 (for communicating with the wireless local area network of the CPE 310).

The CPE 310 is identifiable by a MAC address for a Network Interface Controller (NIC) associated with its access network communications interface 311. Each user device of the plurality of user devices 320 is identifiable by a MAC address of a NIC associated with its respective communications interface 321.

The operator's network 200 includes an access network communications node 210 and a Network Management System (NMS) 220. The access network communications node 210 enables the NMS 220 (and any other node of the operator's network, or any node in an external network connected to the operator's network) to communicate with the CPE 310 via the access connection 400. The NMS 220 includes a communications interface 221, a processor 223 and a memory 225.

Figure 2:
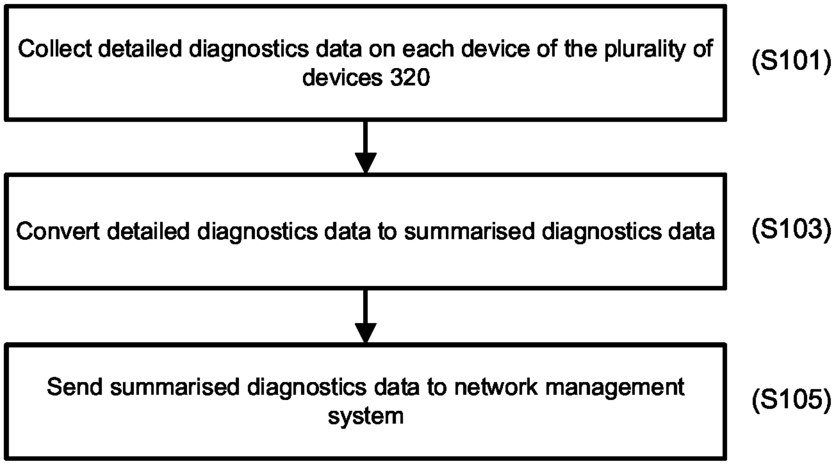
FIG. 2 is a flow diagram of a method of a first and second embodiment of the present disclosure, implemented by a Customer Premises Equipment (CPE) of the network of FIG. 1.
Figure 3:
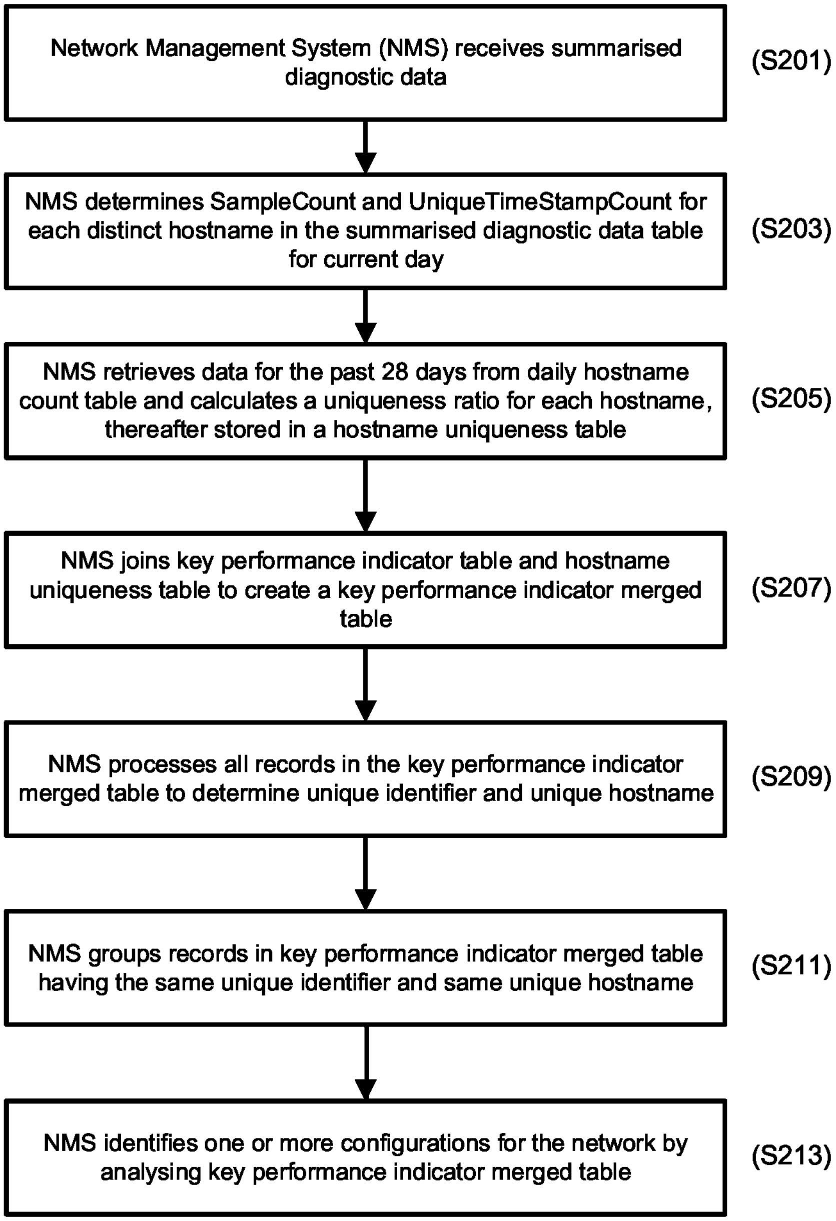
FIG. 3 is a flow diagram of a method of the first embodiment of the present disclosure, implemented by a Network Management System (NMS) of the network of FIG. 1.

A first embodiment of a method of the present disclosure will now be described with reference to FIGS. 2 to 8. FIG. 2 illustrates operations performed by the CPE 310's processing and memory modules 313 and 315, and FIG. 3 illustrates operations performed by the NMS 220's processing and memory modules 223 and 225.

In S101 of the first process, the CPE's processor 313 implements a diagnostics function to collect data on each device of the plurality of devices 320. This data is collected periodically and this periodicity may be remotely configured by the network operator (this periodicity may be in a range from a hundred milliseconds to every ten seconds). Each record in the data includes the MAC address of the user device, a timestamp representing the time the data was collected from the user device, a hostname of the user device, and parameters of the user device. These parameters include Received Signal Strength Indicator (RSSI), downlink physical layer (PHY) rate, and uplink PHY rate. The parameters of the user device may also include:

- A wireless local area network channel number;
- A system name of the access point (which may be different from the name of the CPE where the CPE is a root access point in a mesh wireless local area network);
- Downlink packet counter values;
- Uplink packet counter values;
- Retransmission counter values; and
- Total active time.

This data is hereinafter referred to as detailed diagnostics data. The detailed diagnostics data is stored in the CPE's memory 315.

In S103, the CPE's processor 313 implements a compression function to convert the detailed diagnostics data into summarized diagnostics data. The detailed diagnostics data is converted to summarized diagnostics data periodically and this periodicity may be remotely configured by the network operator (this periodicity may be in the range from one minute to 10 minutes). The conversion may be implemented by applying one or more statistical functions to the detailed diagnostics data, such as a summation, average, maximum, or minimum of each parameter of the user device. The summarized diagnostic data is also stored in the CPE's memory 315.

In S105, the CPE transmits the summarized diagnostic data to the NMS (that is, via the access connection 400). Turning to FIG. 3, in S201, the NMS 220 receives the summarized diagnostic data and stores it in memory 225. S101 to S105 and S201 are performed periodically such that the NMS 220 collects additional records and adds them to the summarized diagnostic data already stored in memory 225. In this embodiment, the summarized diagnostic data stored in memory 225 spans a time period that is greater than the MAC randomization time period implemented by one or more user devices of the plurality of user devices 320.

The NMS 220 stores a first and second table based on the summarized diagnostic data. The first table—a key performance indicator table—includes values for one or more key performance indicators for each user device of the plurality of user devices 320. These key performance indicators include, for example, a total active time, total poor RSSI time, and total poor coverage time (which may be calculated from the summarized diagnostic data). The key performance indicator table includes the MAC address and hostname as identifiers of the user device. The key performance indicator table is updated with new records when additional records are added to the summarized diagnostic data. In this embodiment, the key performance indicator table is updated with new records for the past 28 days (such that any data older than 28 days is removed).

An example key performance indicator table—having a single key performance indicator for total active time—is shown in FIG. 4. It is noted, for the sake of clarity, that placeholder MAC addresses (MAC1, MAC2, MAC3) are used, and these are not in the form of real MAC addresses.

The second table—a daily hostname count table is populated with records as described in S203 below. This first embodiment allows the NMS 220 to determine whether multiple records of the key performance indicator table having different MAC addresses relate to the same user device and, if so, merge those records of the key performance indicator table.

In S203, the NMS processor 223 retrieves data for the current day in the summarized diagnostic data table and processes the retrieved data to calculate, for each distinct hostname in the retrieved data, a first count—named SampleCount—being a count of all records in the retrieved data having that hostname, and a second count—named UniqueTimeStampCount—being a count of all distinct timestamps of the subset of records in the retrieved data having that hostname. The daily hostname count table is updated with an entry for each distinct hostname with its SampleCount and UniqueTimeStampCount values. Each record contains a further field—CalculationDate—identifying the day the SampleCount and UniqueTimeStampCount values were calculated.

The daily hostname count table includes records for each hostname for each day of a time period, which in this embodiment is 28 days (that is, the above process was implemented in each of the past 28 days so as to record the SampleCount and UniqueTimeStampCount values for each distinct hostname in each of the past 28 days).

An example daily hostname count table is shown in FIG. 5. In day 11 of this example, the SampleCount value is 25 and the UniqueTimeStampCount is 24. This may be calculated where there is MAC randomization event on day 11 such that there are two records using the same timestamp, but different MAC addresses, for the same hostname.

In S205, the NMS processor 223 retrieves data for the past 28 days in the daily hostname count table. The NMS processor 223 processes the retrieved data to identify each distinct hostname and calculate, for each distinct hostname, a uniqueness ratio. The uniqueness ratio is calculated as the sum of SampleCount over the 28 days for that hostname divided by the sum of UniqueTimeStampCount over the 28 days for that hostname. NMS processor 223 creates a third table—a hostname uniqueness table—which includes a record for each distinct hostname and further indicates, for each distinct hostname, a binary IsUnique field to indicate whether the uniqueness ratio for that hostname is below a uniqueness threshold (e.g. 1.05 or 1.1). Each record contains a further field—CalculationDate—identifying the day the record is created.

An example hostname uniqueness table is shown in FIG. 6.

In S207, NMS processor 223 joins the key performance indicator table and the hostname uniqueness table on the hostname field to create a new table—the key performance indicator merged table. The key performance indicator merged table includes all fields from the key performance indicator table and, for that hostname, the IsUnique and CalculationDate fields from the hostname uniqueness table.

In S209, NMS processor 223 processes all records in the key performance indicator merged table to create two new fields-unique identifier and unique hostname. The unique identifier field is determined based on the following logic:

1. If the MAC address of the record in the key performance indicator merged table is a global (also known as universal) MAC address, which may be determined if the second character is not equal to one of 2, 4, A or E, then the unique identifier is set equal to the MAC address;
2. If the MAC address of the record in the key performance indicator merged table is a local MAC address, which may be determined if the second character is equal to one of 2, 4, A or E, and the IsUnique value for the hostname of the record in the key performance indicator merged table is YES, then the unique identifier is set equal to the most recent MAC address for that hostname (that is, the MAC address of a record of the key performance indicator merged table using the same hostname and having the latest timestamp value); and
3. If the MAC address of the record in the key performance indicator merged table is a local MAC address and the IsUnique value for the hostname of the record in the key performance indicator merged table is NO, or there is no hostname value in the record in the key performance indicator merged table, then the unique identifier is set as NULL The unique hostname is determined based on the following logic:

1. If the MAC address of the record in the key performance indicator merged table is a global MAC address, then the unique hostname is set equal to the most recent hostname for that MAC address (that is, the hostname of a record of the key performance indicator table using the same MAC address and having the latest timestamp value);
2. If the MAC address of the record in the key performance indicator merged table is a local MAC address and the IsUnique value for the hostname of the record in the key performance indicator merged table is YES, then the unique hostname is set equal to the hostname of that record in the key performance merged table; and
3. If the MAC address of the record in the key performance indicator merged table is a local MAC address and the IsUnique value for the hostname of the record in the key performance indicator merged table is NO, or there is no hostname value in the record in the key performance indicator merged table, then the unique hostname is set as NULL.

An example of the key performance indicator merged table following S209 is shown in FIG. 7.

In S211, NMS processor 223 groups records in the key performance indicator merged table having the same (non-NULL) unique identifier and same (non-NULL) unique hostname such that the key performance indicator values are combined (e.g. summed).

An example of the key performance indicator merged table following S211 is shown in FIG. 8.

In S213, NMS processor 223 identifies one or more configurations for the network by analyzing data in the key performance indicator merged table. These reconfigurations may be, for example, updating Quality of Service (QOS) parameters for the most active set of devices (that is, those having the greatest "total active time" value), updating steering policies for the most active set of devices, and/or reconfiguring a transmission property of the access point (or set of access points in a mesh network) based on a coverage KPI indicator.

The process may then loop back to S201 for a subsequent performance on the next day. On the next day, the NMS 220 receives additional data to be added to the summarized diagnostic data. The key performance indicator table and daily hostname count table are then updated based on the most recent 28 days of summarized diagnostic data. The remaining operations of the above first embodiment may then be performed on the updated records.

The above first embodiment enables the NMS 220 to determine when multiple records having different MAC addresses relate to the same user device. This is achieved by determining that the hostname associated with those multiple records is sufficiently unique and using the most recent MAC address associated with that hostname as a unique identifier. All records in the key performance indicator table that use that unique hostname may then be analyzed as relating to a single user device.

In the above embodiment, the dataset included records for a single CPE. However, the skilled person will understand that the NMS 220 may collect data from multiple CPEs, and the same method may be applied to this multiple-CPE dataset (e.g. by isolating data for a particular CPE based on a CPE identifier, such as a serial number, and applying the same method to the dataset for that particular CPE).

The skilled person will understand that the first embodiment may be applied when a user device is identified by another form of persistent device label, such as a server name or fully qualified domain name. Furthermore, the first embodiment may be applied in any scenario where a dataset for a CPE's network identifies a user device by its MAC address and device label and that MAC address may change.

A second embodiment of a method of the present disclosure will now be described with reference to FIGS. 2, 9, 10 and 11. This second embodiment utilizes the same telecommunications network as described in FIG. 1. In this second embodiment, the CPE 310 performs the same process as illustrated in FIG. 2 such that it sends summarized diagnostic data to the NMS 220. In this embodiment, NMS 220 performs the following machine learning process to determine that multiple records having different MAC addresses relate to the same user device.

Figure 9:
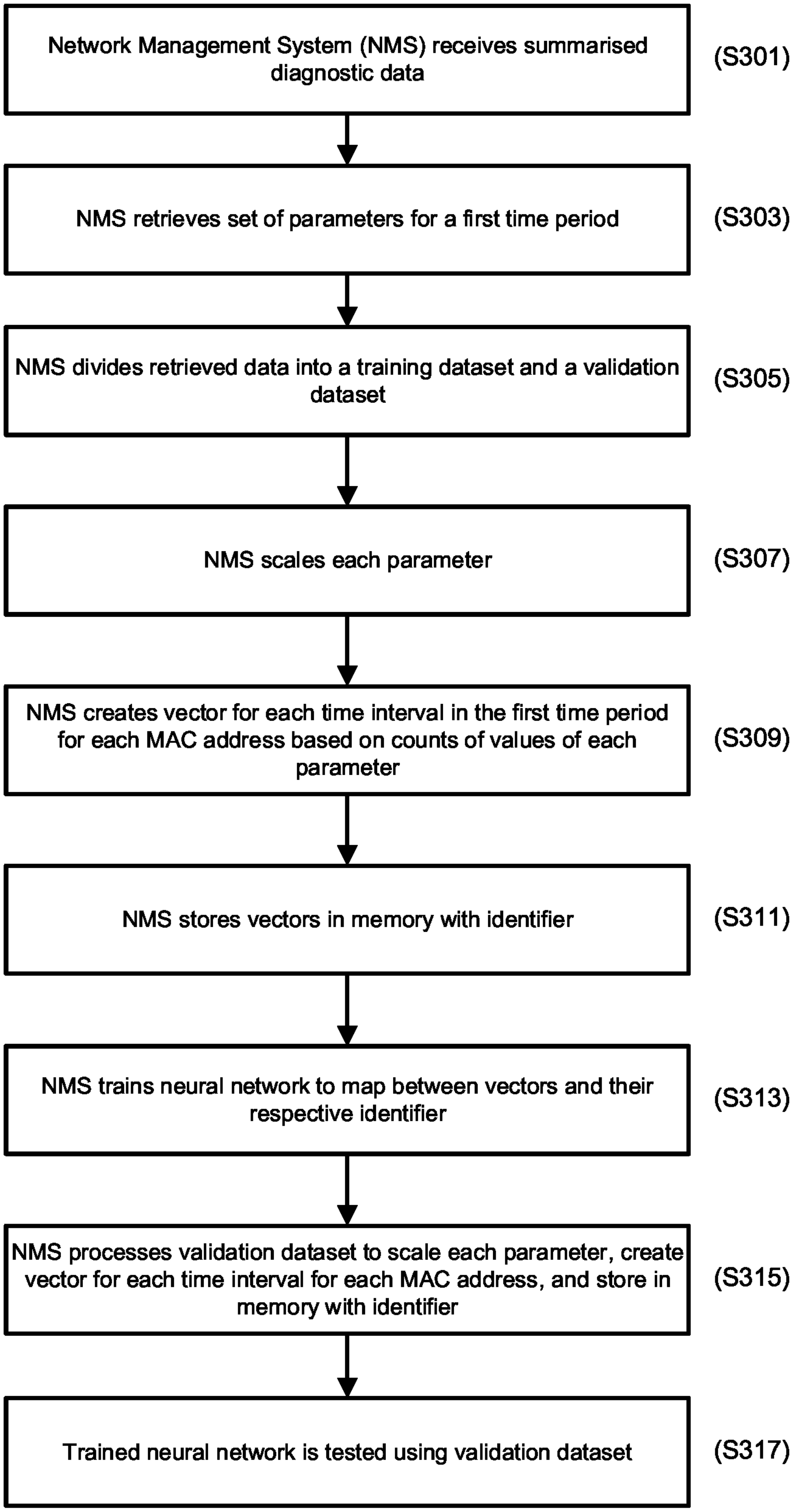
FIG. 9 is a flow diagram of the method of the second embodiment of the present disclosure.

In S301, as illustrated in FIG. 9, the NMS 220 receives the summarized diagnostic data and stores it in memory 225. In S303, NMS processor 223 retrieves the MAC address. RSSI, downlink PHY rate, and uplink PHY rate of each record for a first time period (this may be limited to those records of the key performance indicator table—in the first embodiment above—where the unique identifier and unique hostname fields are NULL). This first time period is selected such that it is less than a MAC randomization time period of any one of the user devices. For example, if the MAC randomization time period is such that one or more user devices updates its MAC address once every 24 hours, then the time period of the retrieved data is less than 24 hours (e.g. 12 hours, 8 hours, or 6 hours).

In S305, NMS processor 223 divides the retrieved data into a training dataset and a validation dataset. In S307, NMS processor 223 determines the minimum and maximum values of each parameter for all records in the training dataset, and scales the values of each parameter of each record independently between 0 and 1 based on their original value and the minimum and maximum values.

In S309, NMS processor 223 processes the training dataset to determine a count of values of each parameter in consecutive non-overlapping intervals of 0.1 (that is, 0 to 0.1, 0.1 to 0.2, . . . , 0.9 to 1) for each MAC address for a plurality of time intervals (that is, a first hour, a second hour, etc.) in the time period.

Figure 11:
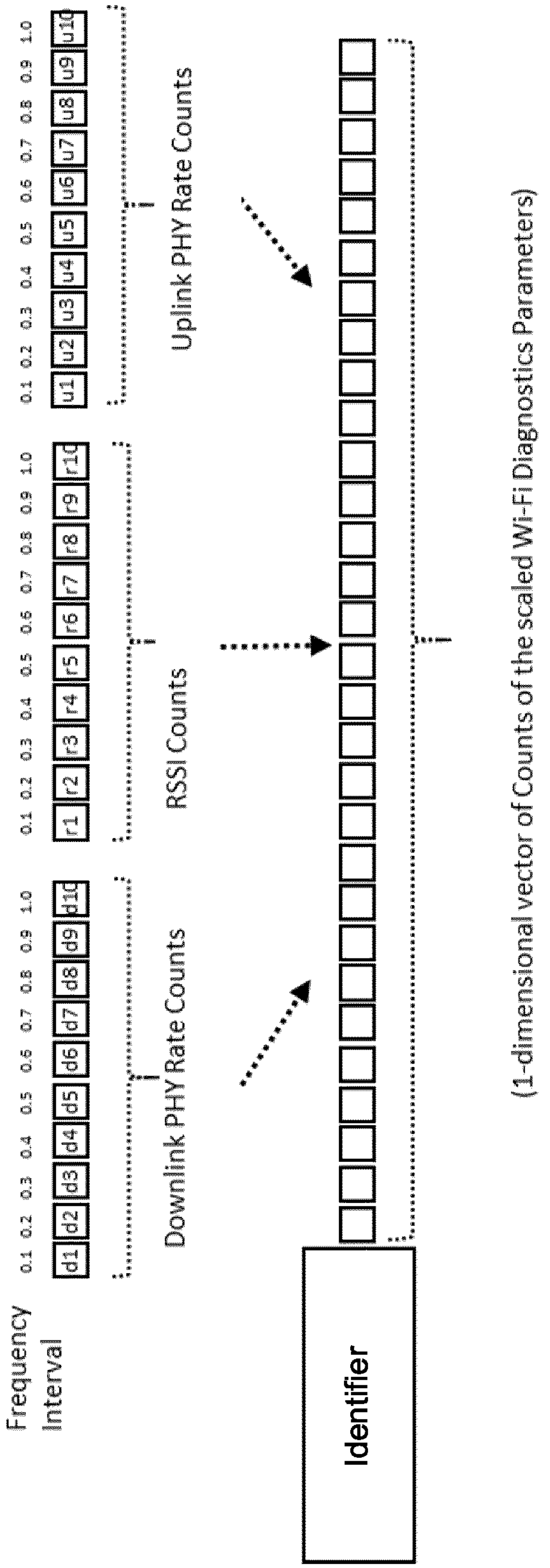
FIG. 11 is a representation of an input vector used in the method of the second embodiment of the present disclosure.

The NMS processor 223 therefore determines, for a first MAC address for a first hour in the time period, a count of values of each parameter between 0 and 0.1, a count of values of each parameter between 0.1 and 0.2, and so on; determines, for the first MAC address for the second hour in the time period, a count of values of each parameter between 0 and 0.1, a count of values of each parameter between 0.1 and 0.2, and so on. A 1-dimensional vector is created for each MAC address in the training dataset for each hour in the time period, which contains the counts of downlink PHY rate in each interval from 0 to 0.1 to 0.9 to 1, the counts of RSSI in each interval from 0 to 0.1 to 0.9 to 1, and the counts of uplink PHY rate in each interval from 0 to 0.1 to 0.9 to 1. An example of this vector being constructed from these counts is illustrated in FIG. 11. In S311, these vectors for the training dataset are stored and each associated with an identifier, the identifier being unique to the MAC address (and therefore the user device) from which the vector was derived in S309.

In S313, a neural network is trained to map between the vectors of the training dataset and the associated identifier. In this second embodiment, the "neuralnet" library of the R programming language was used in which the input layer consists of the vectors, the output layer consists of the identifiers associated with the vectors, and the hidden layer has a number of dimensions that is greater than a count of distinct identifiers and less than a count of elements in the vector (that is, 30 in this example in which each vector contains 10 intervals for each of the three parameters). In more detail, the neuralnet parameters are selected as follows:

- Sigmoid/Activation function: Logistic (although ReLu and tanh may be used instead);
- Repetitions: 1 (although this may be in the range of 1 to 5);
- Minimum threshold: 1e-4 (although this may be in the range of 1e-3 to 1e-5);
- Learning rate: 0.01 (although this may be in the range of 0.005 to 0.03);
- Error function: Sum of Squared Error (SSE) (although cross-entropy may be used instead); and
- Number of time intervals: 24 (although 5 to 15 may be used instead)

It is noted that the above process is performed on summarized diagnostic data for a particular CPE, such that the neural network is trained for that particular CPE. If the NMS 220 receives data from multiple CPEs, then the above process is performed on the subset of data relating to a particular CPE (that is, by retrieving data in S301 relating to that particular CPE by using a unique identifier for that CPE, such as its serial number) such that the remaining operations train a neural network for that particular CPE. The neural network may also be retrained periodically, such as every hour, based on the most recent data in the summarized diagnostic data.

In S315, the NMS processor 223 processes the validation dataset in the same way as described above in S307 to S311 (i.e. NMS processor 223 scales the values of each parameter of each record in the validation dataset, creates vectors for each MAC address, and stores each vector in memory with an associated identifier, the identifier being unique to the MAC address). In S317, the trained neural network is tested using the vectors of the validation dataset as input. If the performance of the trained neural network satisfies a threshold (based on a comparison of the output of the trained neural network with the identifiers associated with each vector in the validation dataset), then the trained neural network is validated and may be used in the subsequent operations of this second embodiment. If the performance of the trained neural network does not satisfy the threshold, then the neural network may be retrained (for example, by using different training data and/or different neuralnet parameters).

Figure 10:
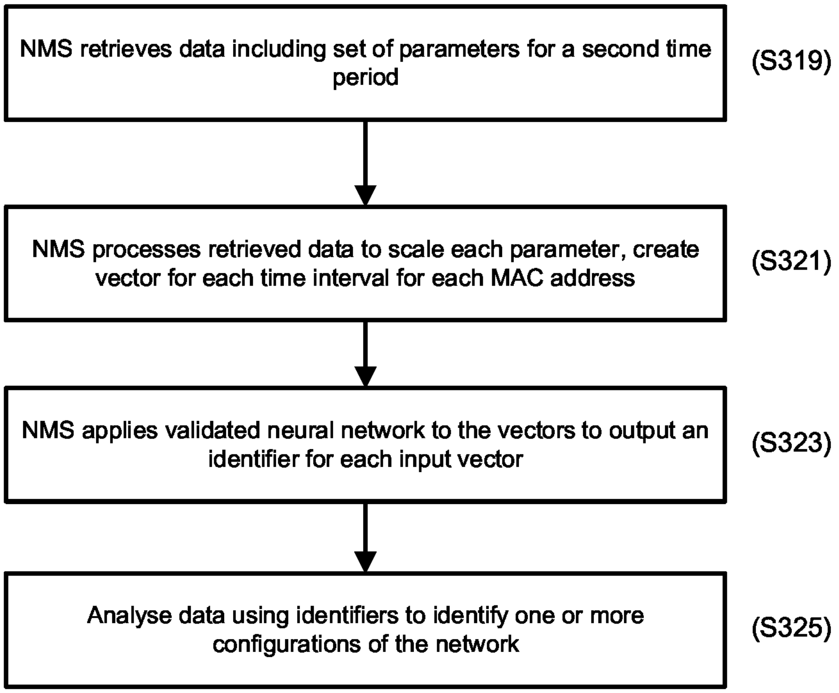
FIG. 10 is a flow diagram of a method of the second embodiment of the present disclosure.

Turning to FIG. 10, in S319, NMS processor 223 retrieves data from the summarized diagnostic data covering the RSSI, downlink PHY rate and uplink PHY rate of each record for a second time period. This second time period is now greater than the MAC randomization time period of one or more of the user devices, such that multiple records relating to the same device may have different MAC addresses such that it cannot be determined, based on those records alone, whether those multiple records relate to the same user device or not. To solve this problem, in S321, NMS processor 223 processes the data retrieved in S319 in the same way as described above in S307 to S309 (i.e. NMS processor 223 scales the values of each parameter of each record in the retrieved data, and creates vectors for each MAC address). In S323, NMS processor 223 applies the validated neural network to the data (retrieved in S319 and processed in S321), which outputs an identifier for each input vector. This identifier therefore identifies all records in the data that relate to the same device, even if they use different MAC addresses. In S325, the data may be analyzed with this identifier (and this analysis may involve other parameters that did not form part of the vector) to identify one or more reconfigurations of the telecommunications network. This analysis may be, for example:

- to create coverage indicators for the CPE based on the RSSI values of each user device, which may be used to reconfigure a transmission parameter of the CPE;
- to create usage patterns, roaming behavior patterns, and other key performance indicators for each user device, which may be used to identify high-usage devices and/or problematic devices and assign new QoS parameters and/or new steering policies for those devices.

The skilled person will understand that it is non-essential that the neuralnet library of the R programming language is used, and that any suitable machine learning process may be used instead (including a support vector machine, random forest, or other form of neural network, such as a convolutional neural network or a recurrent neural network). The data preparation stages of S303 to S311 may still be applied when using these other machine learning processes.

In the above embodiments, the CPE 310 and access network communications node 210 are connected by a DSL. However, this is non-essential and other forms of access connection, such as fixed wireless access or FTTP, may also be used.

In the first embodiment, the hostname uniqueness threshold is in a range of 1.05 to 1.1. However, this is non-essential. This threshold is determined by the MAC randomization period. The shorter the randomization period is (relative to the time window used for determining the hostname uniqueness value, which was 28 days in the first embodiment), the higher the threshold will be. In other words, the hostname uniqueness threshold has an inverse relationship to the MAC randomization period.

In the second embodiment, the RSSI, downlink PHY rate and uplink PHY rate were used to identify records that relate to the same user device. The present inventors have identified that using three parameters provides the right balance of accuracy (in identifying records relating to the same device) without unnecessary computation (as more than three parameters will increase the resources required to train/run the machine learning model. Furthermore, RSSI, downlink PHY rate and uplink PHY rate and examples only, and other parameters may be used.

The skilled person will understand that any combination of features is possible within the scope of the disclosure, as claimed.

The invention claimed is:

1. A method of operating a data processing apparatus to analyze a wireless local area network, the wireless local area network including a plurality of devices, wherein at least one device of the plurality of devices is configured to change its Media Access Control (MAC) address, the method comprising:

- obtaining data including a plurality of records, wherein each record of the plurality of records relates to a device of the plurality of devices and includes:
  - a device label,
  - a MAC address, and
  - a set of performance metrics;
- for each device label in the plurality of records, determining a uniqueness value for that device label based on a ratio of a count of records in the plurality of records that use that device label to a count of distinct timestamps in the plurality of records that use that device label;
- processing each record of the plurality of records so as to assign a unique identifier to the respective record by determining that the MAC address of the respective record is a local MAC address and that the uniqueness value of the device label satisfies a uniqueness threshold; and
- analyzing the set of performance metrics for a plurality of records having the same unique identifier.

2. The method as claimed in claim 1, wherein analyzing the set of performance metrics includes combining the set of performance metrics for all of the records using the same unique identifier.

3. The method as claimed in claim 1, wherein analyzing the set of performance metrics comprises:

- causing a configuration of a device of the plurality of devices by analyzing the set of performance metrics for the plurality of records having the same unique identifier.

4. A non-transitory computer-readable carrier medium comprising a computer program comprising instructions which, when the computer program is executed by a data processing system, causes the data processing system to carry out the method of claim 1.

5. A data processing system comprising a processor adapted to perform the method of claim 1.

* * * * *